March 18, 1941.  J. MEISTERHANS  2,235,078

NUT AND SCREW FASTENING

Filed Aug. 21, 1939

INVENTOR.
JOSEF MEISTERHANS.

ATTORNEY.

Patented Mar. 18, 1941

2,235,078

UNITED STATES PATENT OFFICE 2,235,078

NUT AND SCREW FASTENING

Josef Meisterhans, Gotha, Germany, assignor to Gothaer Waggonfabrik Aktiengesellschaft, Gotha, Germany, a company of Germany Application August 21, 1939, Serial No. 291,261
In Germany January 19, 1939

3 Claims. (Cl. 85—32)

The invention relates to screw and nut fastenings of the kind wherein the nut has fixed thereto a washer or flange by means of which it exerts the requisite clamping pressure when the screw is tightened up. Where the washer consists of metal and the part upon which the washer is seated when the fastening has been made likewise consists of metal, a rigid or permanent connection between the washer and its seat can generally be made without difficulty, by means of screws or rivets, in order to give greater security, but this method is by no means easy where the part on which the washer rests is non-metallic, and consists for example of the plywood frequently used in aircraft construction. Small screws fixing a metal flange to a thin sheet of plywood give a poor hold and are liable to cause considerable trouble.

According to my invention this is avoided by providing the nut with a non-metallic washer fixed thereto, and fastening this washer by means of adhesive to the part on which the nut rests when the fastening is made. This enables the nut to be fixed quite securely to the part which it is to hold, with avoidance of all the inconvenience of drilling holes for screws or other measures requiring a considerable degree of precision.

Where the part which is to carry the nut is a thick board or block the nut with its washer or flange may be counter-sunk in a cavity therein, the flange being fastened by means of the adhesive to a ledge within the cavity.

Any convenient method may be used for fixing the non-metallic flange or washer to the nut. A preferred method available where the flange consists of moderately ductile material will be described hereinafter.

Figure 1:
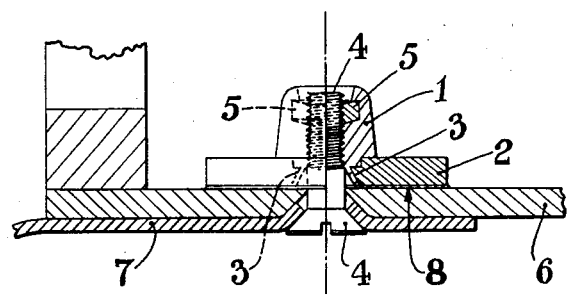
Figure 2:
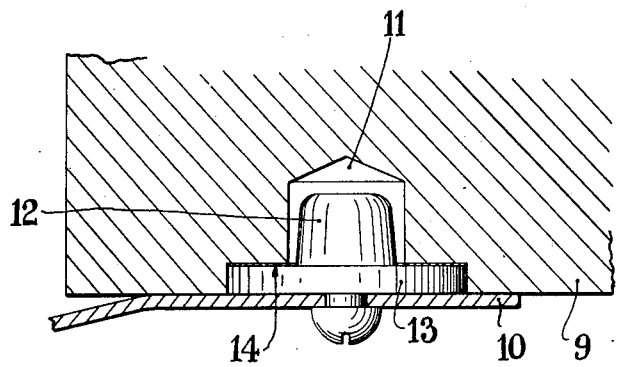

Two embodiments of the invention are shown in the accompanying drawing, in Figs. 1 and 2 respectively, the fastening shown in Fig. 1 being partly in section and partly in elevation, and that shown in Fig. 2 being in elevation, with the parts held by the nut and screw in section.

Referring first to Fig. 1, 2 is a washer of moulded material, such as the plastic known as "harex," and 1 is a metal nut having a tubular boss 3 engaging into the eye of the washer. The boss 3 is conically expanded, compressing the somewhat ductile material of the washer so as to lock the washer very securely to the nut. The screw 4 is screwed into the nut, which has at the top a cavity 5 with a fibre washer 5 therein.

In conjunction with the nut and the non-metallic washer 2 the screw holds together a board 6 and a metal plate 7 and upon the under surface of the washer 2 there is a coating of adhesive 8 whereby the washer is permanently fastened to the board. For clearness the thickness of the adhesive coating is exaggerated in the drawing. On removal of the screw for separating the parts 6 and 7 the washer 1, holding the nut, remains firmly attached to the part 6, ready for re-attachment of the part 7.

In the embodiment shown in Fig. 2 the non-metallic part 9 to which the metal plate 10 is to be joined has a cavity 11. The inside portion of this cavity is of a diameter slightly larger than that of the nut 12, but the outer part of the cavity is of sufficient diameter to receive the non-metallic washer 13 and its depth is equal to the thickness of the washer. The coating 14 of adhesive is in this case on the upper face of the washer, which is by means of the adhesive attached to the ledge in the cavity 11.

What I claim as my invention and desire to secure by Letters Patent of the United States is:

1. The combination, with a screw nut, of a washer of non-metallic material fixed to said nut and adapted to be fastened by means of adhesive to a non-metallic surface.

2. The combination of a screw nut having a central, coned annular boss, and a washer of non-metallic material adapted to be fastened by means of adhesive to a non-metallic surface, said washer having a coned central bore and said boss engaging into said bore to lock said washer to said nut.

3. The combination, with a screw nut, of a non-metallic washer fixed to said nut and coated with adhesive on its lower surface for the purpose set forth.

JOSEF MEISTERHANS.